(12) United States Patent
Mathieu et al.

(10) Patent No.: US 8,781,170 B2
(45) Date of Patent: Jul. 15, 2014

(54) VEHICLE GHOSTING ON FULL WINDSHIELD DISPLAY

(75) Inventors: Roy J. Mathieu, Rochester Hills, MI (US); Joseph F. Szczerba, Grand Blanc, MI (US); Dehua Cui, Northville, MI (US); Thomas A. Seder, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 162 days.

(21) Appl. No.: 13/312,045

(22) Filed: Dec. 6, 2011

(65) Prior Publication Data

US 2013/0142385 A1 Jun. 6, 2013

(51) Int. Cl.
*G06K 9/00* (2006.01)

(52) U.S. Cl.
USPC ............................................ 382/104

(58) Field of Classification Search
None
See application file for complete search history.

(56) References Cited

U.S. PATENT DOCUMENTS

| | | | |
|---|---|---|---|
| H1109 H * | 10/1992 | Roberts et al. ................ 345/7 |
| 5,577,913 A * | 11/1996 | Moncrief et al. ............. 434/69 |
| 6,986,581 B2 | 1/2006 | Sun et al. |
| 7,090,355 B2 | 8/2006 | Liu et al. |
| 7,126,583 B1 * | 10/2006 | Breed ........................ 345/158 |
| 7,162,370 B2 * | 1/2007 | Obradovich ................. 701/301 |
| 7,182,467 B2 | 2/2007 | Liu et al. |
| 7,213,923 B2 | 5/2007 | Liu et al. |
| 7,233,233 B2 * | 6/2007 | Taniguchi et al. ............ 340/435 |
| 7,460,951 B2 | 12/2008 | Altan et al. |
| 7,486,175 B2 * | 2/2009 | Suzuki et al. ................ 340/435 |
| 8,036,823 B2 * | 10/2011 | Akita et al. .................. 701/429 |
| 8,098,170 B1 | 1/2012 | Szczerba et al. |
| 8,098,171 B1 | 1/2012 | Szczerba et al. |
| 8,384,531 B2 * | 2/2013 | Szczerba et al. ............. 340/435 |
| 2002/0049534 A1 * | 4/2002 | Yuda et al. ................. 701/209 |
| 2003/0122687 A1 * | 7/2003 | Trajkovic et al. ........... 340/932.2 |
| 2005/0232469 A1 * | 10/2005 | Schofield et al. ............ 382/104 |
| 2006/0100774 A1 * | 5/2006 | Barkowski et al. .......... 701/200 |
| 2007/0103341 A1 * | 5/2007 | Kreiner et al. .............. 340/988 |
| 2008/0158510 A1 | 7/2008 | Tant et al. |
| 2009/0121891 A1 | 5/2009 | Sigillito |
| 2009/0268946 A1 | 10/2009 | Zhang et al. |
| 2010/0076684 A1 * | 3/2010 | Schiffmann et al. ......... 701/301 |
| 2010/0125412 A1 * | 5/2010 | Suddreth et al. ............ 701/211 |
| 2010/0253489 A1 * | 10/2010 | Cui et al. .................. 340/425.5 |
| 2010/0253492 A1 | 10/2010 | Seder et al. |
| 2010/0253493 A1 * | 10/2010 | Szczerba et al. ............. 340/435 |

(Continued)

FOREIGN PATENT DOCUMENTS

DE 10245334 A1 4/2004
DE 102005044771 A1 3/2007

OTHER PUBLICATIONS

U.S. Appl. No. 12/900,566, Szczerba et al.
U.S. Appl. No. 12/903,267, Seder et al.

(Continued)

*Primary Examiner* — Stephen R Koziol
*Assistant Examiner* — Sean Conner

(57) ABSTRACT

A method to display a ghosting image upon a transparent windscreen head-up display in a vehicle includes monitoring an operating environment of the vehicle, monitoring a driver registration input, determining a registered desired location graphic illustrating a future desired location for the vehicle based upon the operating environment of the vehicle and the driver registration input, and displaying the registered desired location graphic upon the head-up display.

25 Claims, 2 Drawing Sheets

(56) References Cited

U.S. PATENT DOCUMENTS

| | | | |
|---|---|---|---|
| 2010/0253526 A1 | 10/2010 | Szczerba et al. | |
| 2010/0253539 A1 | 10/2010 | Seder et al. | |
| 2010/0253540 A1 | 10/2010 | Seder et al. | |
| 2010/0253541 A1 | 10/2010 | Seder et al. | |
| 2010/0253542 A1 | 10/2010 | Seder et al. | |
| 2010/0253543 A1* | 10/2010 | Szczerba et al. | 340/932.2 |
| 2010/0253593 A1 | 10/2010 | Seder et al. | |
| 2010/0253594 A1* | 10/2010 | Szczerba et al. | 345/7 |
| 2010/0253595 A1 | 10/2010 | Szczerba et al. | |
| 2010/0253596 A1 | 10/2010 | Szczerba et al. | |
| 2010/0253597 A1 | 10/2010 | Seder et al. | |
| 2010/0253598 A1 | 10/2010 | Szczerba et al. | |
| 2010/0253599 A1 | 10/2010 | Szczerba et al. | |
| 2010/0253600 A1 | 10/2010 | Seder et al. | |
| 2010/0253601 A1 | 10/2010 | Seder et al. | |
| 2010/0253602 A1 | 10/2010 | Szczerba et al. | |
| 2010/0253688 A1 | 10/2010 | Cui et al. | |
| 2010/0253918 A1 | 10/2010 | Seder et al. | |
| 2010/0254019 A1 | 10/2010 | Cui et al. | |
| 2010/0289632 A1 | 11/2010 | Seder et al. | |
| 2010/0292886 A1 | 11/2010 | Szczerba et al. | |
| 2011/0001639 A1* | 1/2011 | Sasaki et al. | 340/995.19 |
| 2011/0193773 A1* | 8/2011 | Uphill et al. | 345/156 |
| 2012/0089273 A1 | 4/2012 | Seder et al. | |
| 2012/0093357 A1 | 4/2012 | Seder et al. | |
| 2012/0169513 A1 | 7/2012 | Szczerba et al. | |
| 2012/0169572 A1 | 7/2012 | Seder et al. | |
| 2012/0169861 A1 | 7/2012 | Szczerba et al. | |
| 2012/0173067 A1 | 7/2012 | Szczerba et al. | |
| 2012/0173069 A1 | 7/2012 | Tsimhoni et al. | |
| 2012/0174004 A1 | 7/2012 | Seder et al. | |
| 2013/0076787 A1 | 3/2013 | Mathieu et al. | |
| 2013/0141250 A1 | 6/2013 | Mathieu et al. | |
| 2013/0144521 A1 | 6/2013 | Mathieu et al. | |

OTHER PUBLICATIONS

U.S. Appl. No. 12/980,503, Szczerba et al.
U.S. Appl. No. 12/979,432, Szczerba et al.
U.S. Appl. No. 12/900,539, Seder et al.
U.S. Appl. No. 12/980,522, Seder et al.
U.S. Appl. No. 12/980,612, Szczerba et al.
U.S. Appl. No. 12/981,206, Tsimhoni et al.
U.S. Appl. No. 12/981,602, Szczerba et al.
U.S. Appl. No. 12/982,478, Seder et al.
U.S. Appl. No. 13/239,667, Mathieu et al.
U.S. Appl. No. 13/309,691, Mathieu et al.
U.S. Appl. No. 13/309,716, Mathieu et al.
U.S. Appl. No. 13/356,695, Mathieu et al.

* cited by examiner

US 8,781,170 B2

VEHICLE GHOSTING ON FULL WINDSHIELD DISPLAY

TECHNICAL FIELD

This disclosure is related to vehicle control related display upon a windscreen.

BACKGROUND

The statements in this section merely provide background information related to the present disclosure and may not constitute prior art.

Vehicle systems include capabilities to track vehicle movement, for example, with relation to a three dimensional map or coordinate system. Tracking vehicle movement can be accomplished through a global positioning device, use of on vehicle sensors such as camera, radar device, or a LIDAR device or other devices known in the art. Additionally, wireless communication can be utilized to provide navigational or informational support from a remote system or device, such as a remotely operated computer or cloud computing system. Graphic projection systems can utilize an ultraviolet laser or other light source to project an image or graphics upon a vehicle surface. In one embodiment, the vehicle surface can be a substantially transparent windscreen head-up display. In other embodiments, the vehicle surface can be a rear window, side windows, or pillars supporting a roof of the vehicle. Projected graphics can include driver's aids, providing information to the driver to improve situational awareness or provide information related to a planned route or path of travel or operation of the vehicle.

SUMMARY

A method to display a ghosting image upon a transparent windscreen head-up display in a vehicle includes monitoring an operating environment of the vehicle, monitoring a driver registration input, determining a registered desired location graphic illustrating a future desired location for the vehicle based upon the operating environment of the vehicle and the driver registration input, and displaying the registered desired location graphic upon the head-up display.

BRIEF DESCRIPTION OF THE DRAWINGS

One or more embodiments will now be described, by way of example, with reference to the accompanying drawings, in which.

DETAILED DESCRIPTION

Figure 1:
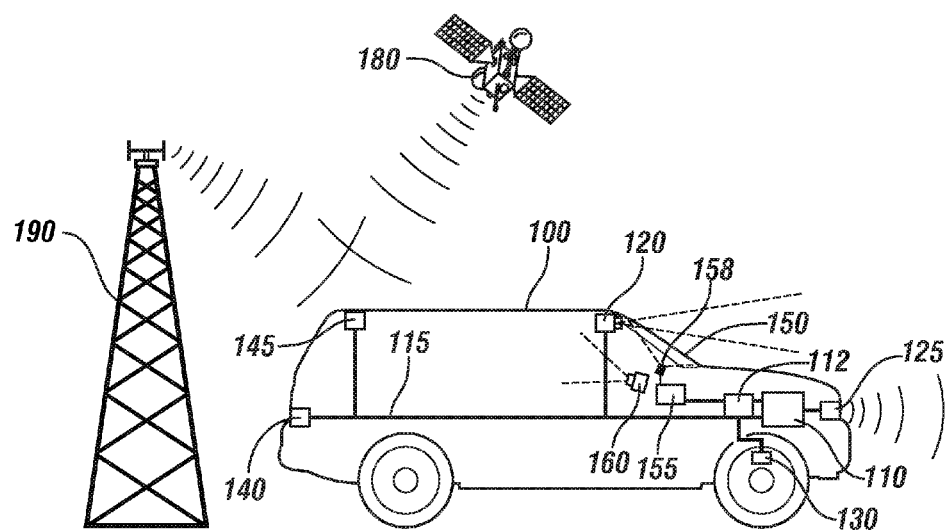
FIG. 1 illustrates an exemplary vehicle equipped with an enhanced vision system, in accordance with the present disclosure.

Referring now to the drawings, wherein the showings are for the purpose of illustrating certain exemplary embodiments only and not for the purpose of limiting the same, FIG. 1 illustrates an exemplary source vehicle equipped with an enhanced vision system (EVS). An exemplary EVS system is disclosed in commonly assigned and co-pending U.S. application Ser. No. 12/417,077, which is incorporated herein by reference. Source vehicle 100 includes an EVS system manager 110; vehicle sensor systems, including camera system 120 and radar system 125; vehicle operation sensors, including vehicle speed sensor 130; information systems, including global positioning device 140 and wireless communication system 145; head-up display (HUD) 150; EVS graphics system 155; graphics projection system 158; and occupant eye location sensing system 160. The EVS system manager can communicate directly with various systems and components, or the EVS system manager can alternatively or additionally communicate over a LAN/CAN system 115. Additionally, the EVS system manager can communicate with remote systems through wireless communication system 145.

The source vehicle can operate upon a roadway in isolation, such as a race track or an open highway, and wherein placement and orientation of the source vehicle upon the roadway is the primary input. Additionally, the source vehicle can operate upon a roadway in the presence of traffic or other obstacles that need to be taken into account to maneuver the source vehicle. Details of an operating environment of the source vehicle can be monitored by a number of devices and/or systems. Camera system 120 includes a camera or image capturing device taking periodic or sequential images representing a view from the source vehicle. Radar system 125 includes a device known in the art utilizing electromagnetic radiation to detect other vehicles or objects located near the source vehicle. A number of known in-vehicle sensors are used within a vehicle to monitor vehicle speed, engine speed, wheel slip, and other parameters representative of the operation of the source vehicle. Vehicle speed sensor 130 represents one such an in-vehicle sensor, but the scope of the disclosure includes any such sensors for use by the EVS. Global positioning device 140 and wireless communication system 145 communicate with resources outside of the source vehicle, for example, satellite system 180 and cellular communications tower 190. Global positioning device 140 may be utilized in conjunction with a three-dimensional (3D) map database including detailed information relating to a global coordinate received by the global positioning device 140 regarding the current location of the source vehicle. Additionally, vehicle-to-vehicle or vehicle-to-infrastructure communications can be utilized to obtain information. For example, vehicles can network to provide each other with detailed location information of each vehicle and collectively describe road geometry. Further, infrastructure devices can transmit a localizing signal, permitting the source vehicle to be located and oriented to a coordinate system with improved accuracy. Further, infrastructure devices can monitor traffic, road conditions, weather, or other pertinent information and transmit the information to proximately located vehicles. Information from the vehicle sensor systems and the vehicle operation sensors can be utilized by the EVS system manager 110 to monitor the current orientation of the source vehicle. Orientation can include a number of parameters known in the art detailing how the source vehicle is configured upon the roadway and a condition of the vehicle. Exemplary parameters include pitch, roll, yaw, heave, and warp.

HUD 150 includes a windscreen equipped with features capable of displaying an image projected thereupon while remaining transparent or substantially transparent such that occupants of the source vehicle can clearly observe outside of the source vehicle through the windscreen. HUD 150 can include features capable of displaying in image on a portion of the windscreen or on a substantially entirety of the full windscreen. One will appreciate that while HUD 150 includes the windscreen in the front of the source vehicle, other surfaces within the source vehicle can additionally or alternatively be used for projection, including side windows and a rear window. Additionally, the view on the front windscreen could be continued upon the "A-pillars" of the source vehicle and onto the side windows as a continuous image. EVS graphics engine 155 includes display software or programming translating requests to display information from the EVS system manager 110 in graphical representations of the information. The EVS graphics engine 155 includes programming to compensate for the curved and tilted surface of the windscreen and any other surfaces onto which graphics are to be projected. EVS graphics engine 155 controls graphics projection system 158 including a laser or projector device producing an excitation light to project the graphical representations.

A driver registration input enables display of a registered graphic upon the HUD 150, with the graphic being located upon the HUD relative to the view of the driver and the context of objects or roadway details visible through the HUD. A driver registration input can include information about the location of the eyes and/or the head of the driver. Occupant eye location sensing system 160 includes sensors known in the art to approximate a location of the head of an occupant and further the orientation or gaze location of the eyes of the occupant. Based upon the output of the occupant eye location sensing system 160, the current location and orientation of the source vehicle 100, a user input location and a future driving or navigation maneuver location, EVS system manager 110 can accurately dynamically register the graphical representations to the HUD 150 such that the occupant sees the images overlaid with visual images through the display.

The EVS and other devices or systems in the source vehicle can use or be a part of a control module within the source vehicle. Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

Graphics generated upon HUD 150 can include a number of different embodiments serving different functions. According to one embodiment, graphics can be a driver's aid, representing information useful to the driver with respect to control of the source vehicle. One such driver's aid can include a ghosting image or an image of another vehicle some increment in front of the source vehicle showing a recommended or reference location and/or orientation for the source vehicle at some point in the future. A method is disclosed to project a vehicle ghosting image upon a HUD to aid the driver in controlling the source vehicle.

Vehicle ghosting, projecting a representation of another vehicle in a field of view in front of the source vehicle being driven can have a number of applications. A ghosting image can be used to visually coach a driver, aiding the driver to operate the source vehicle according to a suggested path or route. A ghosting image can illustrate to a viewer a registered desired location graphic, illustrating a future desired location for the source vehicle; a desired orientation graphic, illustrating a future desired orientation for the source vehicle; or a registered desired location and orientation graphic, illustrating a future desired location and a future desired orientation for the source vehicle, depending upon the particular conditions. One having skill in the art will appreciate that a continuous representation of a ghosting image upon a HUD illustrating only a desired location can inherently illustrate an orientation for the source vehicle without expressly forming a graphic addressing orientation based upon normal travel and the trajectory of the source vehicle. One group of applications includes applications useful in a racing environment. For example, a representation of another vehicle can be used to project to a driver an ideal or recommended location that the source vehicle should be at some point in the future according to a desired or recommended path for the source vehicle. For example, a driver can be shown his future location on the race track during a best lap with a two second lead upon his current location. In this way, the driver can best control the source vehicle to match the desired behavior during the best, modeled or posted lap. Alternatively, a desired maneuver can be modeled based upon information available to the EVS, for example, including monitored racing conditions including a condition of the track, the weather, and a condition of the source vehicle, including estimated tire wear, weight of the source vehicle, and monitored performance of the source vehicle through the race. The driver or a spotter supporting the driver can indicate a desire for the source vehicle to pass another vehicle on the track. Although the desired maneuver has never been performed in this precise situation, a vehicle ghosting image projecting for the driver a recommended course to accomplish the desired maneuver can be determined and projected. An exemplary graphic can be based upon information representing the current location of the source vehicle upon the track, the track geometry, the location of the vehicle to be passed and other proximate vehicles, and capabilities of the source vehicle to accelerate and maneuver. Such a vehicle ghosting graphic can be dynamic, for example, taking into account actual movements of the source vehicle being driven or apparent reactions of the driver of the other vehicle. Additional graphics can be projected, for example, including a plan view of the track proximate to the source vehicle. Such a plan view can include the current location of the source vehicle, a projection of the ghosting image upon the plan view, location of other traffic, and additional graphics relaying other information.

The EVS can determine or modify graphics to be projected based upon other factors, for example, based upon the track being wet, based upon observed behavior of other vehicles on the track, based upon known or estimable factors of the source vehicle such as tire wear, or based upon remote input from an expert observing the race. In one exemplary condition, wherein a sudden rainfall upon a section of a track is detected, graphics can be changed to reflect an effect that the rain will have upon the track. For example, a racing line and a braking point for a turn can change dramatically based upon whether the track is dry or wet.

Additionally or alternatively, a ghost image can be projected to illustrate where the source vehicle was during its best lap time indexed to the current lap time. In one embodiment, two graphics can be projected simultaneously, with one graphic in a first color recommending a location for the source vehicle to travel to and another in a second color illustrating where the source vehicle was on the best lap at the same lap time. A graphic illustrating only a future desired orientation for the source vehicle can be used in racing, for example, illustrating a maneuver to drift the source vehicle through a turn. Such a graphic can include a super-imposed graphic of a steering wheel indicating a recommended control input angle to achieve the desired drift maneuver and other information, for example, illustrating a desired speed to perform the drift versus a present speed. Many embodiments of ghosting images must be registered to the view of the driver to correctly illustrate to the driver the desired future location of the source vehicle. However, it will be appreciated that a ghosting image illustrating a detail such as orientation that does not convey an actual location does not need to be registered to the view of the driver to effectively convey the current or desired orientation of the source vehicle.

Another group of applications includes applications useful in a normal driving environment. For example, a desired or planned route of travel can be projected to the driver through a vehicle ghosting graphic or ghosting image. A planned route of travel can be monitored or determined based upon an input destination, and a recommended or desired location for the source vehicle can be displayed as a registered desired location graphic illustrating a future desired location for the source vehicle. Such a desired location graphic can aid the driver in selecting a correct lane of travel and make correct turns through the planned route of travel. Such a desired location graphic can include additional information. In one embodiment, the graphic can include corresponding text or images indicating an upcoming turn or a current and upcoming travel segment in the planned route. In one embodiment, the graphic can be color coded to express to the driver an importance of the graphic, for example, with a lightly shaded or green graphic illustrating a location or maneuver that is recommended in the next several minutes versus a red or emphasized graphic illustrating a turn that the driver is about to miss. Other priorities that can be used to project graphics upon the HUD include fuel economy, projecting a graphic to recommend driving behavior to the driver based upon estimated fuel consumption, and driving efficiency for an electric or hybrid vehicle. Further a graphic can be projected for collision avoidance or obstacle avoidance, projecting a graphic illustrating a desired evasive maneuver based upon a sensed or communicated object or feature in front of the source vehicle. Further, a graphic can be projected as an instruction to maintain a distance from an emergency vehicle or as an instruction to stop for a school bus. In embodiments wherein a particular message is to be conveyed to the driver, such as emergency or stop immediately, attendant graphics such a text or a large octagonal shape indicating stop can be included with or in place of a ghosting image to fully convey the message.

A graphic can be imported to the source vehicle from an outside source. For example, a retail establishment requiring the driver to maneuver the source vehicle into a particular location can actively manage vehicles by presenting graphics to be projected within the vehicles. For example, an auto repair shop permitting the driver to remain within the source vehicle can instruct a driver approaching the facility which bay to approach and how to maneuver the source vehicle correctly into the bay. In another example, a restaurant can manage different customers with different instructions, for example, with drive through customers being directed in one way and dine-in customers being directed in another. In another example, rental vehicles in a busy rental lot, for example, associated with a busy airport, can be directed in concert with incoming and outgoing traffic to reduce confusion and make the arrangement of the vehicles more orderly. A vehicle sales lot can be similarly directed for customers and for employees, for example, assisting the retrieval of a particular vehicle to be test driven from a congested sales lot. A number of embodiments of retail applications to presenting graphics to be projected to a source vehicle are envisioned, and the disclosure is not intended to be limited to the particular embodiments disclosed.

A graphic illustrating only a future desired orientation for the source vehicle can be used in normal driving, for example, illustrating a sensed or predicted loss of orientation control of the source vehicle. Such a graphic can include a super-imposed graphic of a steering wheel indicating a recommended control input angle to achieve a desired result, maintaining or returning an orientation of the source vehicle according to a desired orientation.

Historical data useful in projecting a ghosting image during a race can be preloaded to a source vehicle. In one embodiment, source vehicle location and orientation data for a selected historical lap can be pre-loaded to the source vehicle. In another embodiment, an expert supporting a driver can utilize an offline device to study a past performance by the driver on the racing track and adjust data to be pre-loaded to the source vehicle including, for example, a model lap to be emulated. Similarly, data from a current race can be loaded into the source vehicle to update the information available to the source vehicle. For example, information can be updated once per lap or at a particular point on the track. Uploaded data can include historical vehicle behavior characteristics and track influences and can be based upon vehicle location, orientation, and other related vehicle dynamics.

Historical data can also be useful in normal driving conditions. For example, if a vehicle takes a same path on a regular basis, deviation from the normal path can be used to initiate enhanced a ghosting image selected to bring the driver back to the normal path, select a new recommended path based upon deviation from the normal path (a ghosting image leading a source vehicle low on fuel into a gas station), or suspend the ghosting image temporarily until the actions of the driver can be confirmed. In another example, historical data can be used to predict traffic flow behavior. For example, if historical data shows that when the source vehicle gets through a first traffic light with a green signal, the source vehicle always is stopped by a second traffic signal, a ghosting image can be shown preparing the source vehicle to stop for the second signal. If traffic on a highway frequently becomes congested in a particular area, a ghosting image preparing the driver to slow down or maintain a greater distance to another vehicle ahead in traffic can be projected. If the source vehicle repeatedly in past travel has to maneuver to avoid a road hazard, a ghosting image can be projected to prepare the driver to avoid the upcoming road hazard. A number of applications of historical data to racing and normal driving are envisioned, and the disclosure is not intended to be limited to the particular exemplary embodiments disclosed.

Another embodiment of a graphic that can be used in a normal driving environment includes driver education. For example, a projected ghosting image can be used to instruct a new driver where the source vehicle should be driven upon the roadway. Graphics can be input or controlled by a driving instructor using an input device in the source vehicle. Graphics can be determined automatically based upon traffic laws and road design or geometry. Additionally, graphics can be based upon configurable user input, for example, with a parent being able to configure the directions given to a youthful driver as an input planned route of travel. In one embodiment, the parent would be able to monitor or review how closely the instructions are followed. In a parking situation, a ghosting image can be animated through a recommended parking maneuver as the source vehicle approaches the parking spot. Driving education can include conditions other than training a new driver, for example, including graphics based upon advanced driver training, commercial driver training, or training for a driver not accustomed to towing an object such as a boat.

Another embodiment of a graphic that can be used in a normal driving environment includes control of a commercial vehicle. Operation of a commercial vehicle can be complex. A ghosting image projected upon a HUD of an exemplary 18-wheel tractor trailer can aid the driver to judge the turning radius required to navigate an intersection or other complicated driving environment. Commercial vehicles can operate in a convoy or train of vehicles upon a highway, with spacing between the vehicles adapted to improve fuel efficiency. Graphics projected upon the HUD can include parameters configured to the convoy, and aiding the driver of a particular vehicle to fine tune the location of the truck within the convoy. Graphics can be based upon signals sent by infrastructure devices, for example, a weighing station by the side of the road instructing the commercial vehicle whether to stop for inspection. Graphics can be based upon instruction from a centralized computer, such as the company owning the commercial vehicle, including manually entered instructions, for example, changing a planned route for the source vehicle, or automated instructions, for example, based upon company policies or regulations.

Another group of applications includes applications useful in a military, law enforcement, or emergency responder environment. Tactical coordination of vehicles in a battlefield situation, in a vehicle chase, or upon reaching a crime, fire, or accident scene can be important. Based upon input from a commander or a scout vehicle, military vehicles can be commanded to change formation, change distances between vehicles, or assume particular locations. A ghosting image upon the HUD of a military vehicle can display to the driver of the source vehicle the commanded behavior of the source vehicle. In a law enforcement situation, a ghosting image can be utilized to direct a source vehicle to a certain point at a crime scene. For example, if a patrol vehicle is approaching a bank robbery in progress, input from a commander in charge of the situation or from a first responder could direct the source vehicle to a point whereat immediate assistance would be most helpful, for example, covering a rear exit of the bank. Similarly, in a vehicle chase wherein law enforcement vehicles are pursuing a fleeing vehicle, an officer on the scene could direct other vehicles in the area of the pursuit, for example, directing a patrol vehicle approaching the scene to a location in front of the fleeing vehicle and/or directing similarly equipped civilian vehicles to get out of harm's way. In an emergency responder situation, a ghosting image based upon information such as instructions from a dispatcher or a unit already on the scene can utilize navigational information, details from sensors in the vehicle, and communicated data to project a recommended location in traffic while en route or a recommended location to take at the scene.

A ghosting image can be displayed persistently upon the HUD, or a ghosting image can be displayed situationally, for example, when a change from the current operation of the source vehicle is desired or recommended. As described above, graphics projected upon the HUD can change based upon the information being presented. Color or presentation of the graphic can change based upon an urgency of the information being presented. Information of low importance or being presented long before required action can be presented in low intensity, in default or assuring colors, and with graphics selected to indicate the nature of the information. For example, a graphic suggesting that the source vehicle change lanes within the next five minutes, can include a faint ghosting image in the desired lane, with just a faint outline of a vehicle and in a default color used on a majority of graphics projected upon the HUD. Either gradually or in graduated steps, as the source vehicle gets close to the time of the recommended lane change while remaining outside of the desired lane, the graphic can change to a more complete image of a vehicle with increased intensity and/or with a color signifying a more urgent message. Graphics associated with information of elevated or immediate urgency, such as an instruction to make room for an emergency vehicle, can include corresponding text or other graphics accompanying the ghosting image directing the source vehicle to a location.

Graphics of the ghosting image can include a number of embodiments. The ghosting image can be a steady image representing a vehicle or an outline of a vehicle some distance or lead time in front of the source vehicle being driven. The outline can be simplified to a box or a circle or some other geometric shape, for example to reduce potential driver distraction from too complicated of a shape being projected. In one embodiment, wherein orientation of the source vehicle is expressly intended to be conveyed, the graphic can include an arrow or a representation of a rotated vehicle to illustrate the desired orientation. In one embodiment, the graphic can include an animated graphic for example, showing a vehicle or graphic transitioning into a desired location. For example, an outline of a vehicle can transition from a point 20 feet in front of the source vehicle to a point 200 feet in front of the source vehicle, illustrating the maneuver that the driver should undertake. In an exemplary embodiment, the graphic can include a repeating cycle including a one second animation of dotted arrows terminating at a desired location followed by an image of a vehicle holding for three seconds at the desired location.

Any of the graphics can be sized or weighted based upon providing effective communication of the information to the driver of the source vehicle without providing an undue distraction to the driver. For example, if the desired location graphic includes a vehicle outline projected at a distance 100 feet in front of the source vehicle, the graphic can be representative of how big a typical vehicle would look at that distance. If the source vehicle is in an urban setting, the source vehicle is traveling slowly, and the desired location graphic includes a vehicle projected 20 feet from the source vehicle, the graphic can be scaled down or otherwise diminished to avoid the graphic being too distracting to the driver. A number of embodiments of graphics that can be used for a ghosting image are envisioned, and the disclosure is not intended to limited to the particular exemplary embodiments disclosed.

Options related to graphics can be configurable by the driver of the source vehicle. Input parameters can be viewed and adjusted. For example a lead time or distance of the ghosting vehicle can be selected or adjusted or returned to an automatically optimized setting. The lead time or distance can be selected to be at a static interval from the source vehicle, or the lead time or distance can be selected to be vehicle speed dependent. Different applications can be selected, for example, with a first selectable application, a normal mode, including situationally presented graphics selected to minimize distractions upon familiar roads, and a second selectable application, a trip mode, wherein persistent graphics can be used to direct the driver over unfamiliar roads. Different graphics can be selected for the ghosting image or attendant graphics. Graphics can be created by the driver, downloaded through the wireless device, or different themes or skins can be downloaded or assembled. In one embodiment, a driver can use one theme for his street legal racing vehicle on the way to the racing tack and a second theme operating his vehicle at the racing track. In another embodiment, a volunteer fireman can use one theme for normal driving and another theme when operating his vehicle on an emergency call. Such options can be presented to the driver as part of a menu of options, for example, visible upon the HUD in a configuration mode or upon a message display device in the source vehicle. Options can be selected through use of buttons, a mouse device, voice recognition inputs, or any other known human/machine interaction device.

A ghosting image can be displayed upon the HUD in a registered location or as a registered graphic, such that the graphic appears to the driver in the proper location with respect to the visible scene through the HUD windscreen. For example, a desired location graphic can be registered to a parking spot or a lane of travel. Registration can be performed based upon an input representing a location of the driver's head and/or eyes. The gaze location of the driver can additionally be monitored as an input. Registration of graphics upon a HUD is described in referenced U.S. application Ser. No. 12/417,077.

Figure 2:
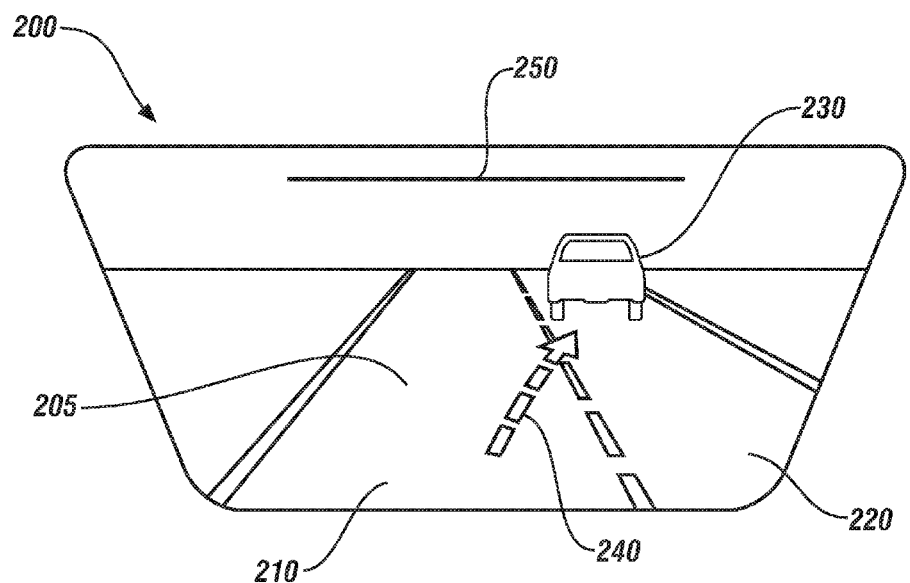
FIG. 2 illustrates an exemplary driving scene in a head-up display with a ghosting image, in accordance with the present disclosure.

FIG. 2 illustrates an exemplary driving scene in a HUD with a ghosting image. Driving scene 200 includes road features visible through the windscreen HUD, including road surface 205, current lane of travel 210, and desired lane of travel 220. Driving scene 200 further includes projected graphics including desired location graphic 230, additional graphic 240, and corresponding text 250. The source vehicle is traveling in current lane of travel 210. Desired location graphic 230 indicates a determined desired location that the source vehicle should travel to desired lane of travel 220. Desired location graphic 230 suggests a lane change from current lane of travel 210 to lane of desired travel 220 and includes a representation of a vehicle estimated to represent how a vehicle would appear in the desired location from the viewpoint of the driver. Additional graphic 240 is displayed as a driver's aid, illustrating for the driver the recommended transition to the location indicated by desired location graphic 230. Corresponding text 250 conveys a message related to the desired location graphic 230. In the exemplary embodiment of FIG. 2, the corresponding text 250 provides a reason for the suggested lane change, indicating a highway exit that needs to be taken in two miles.

Figure 3:
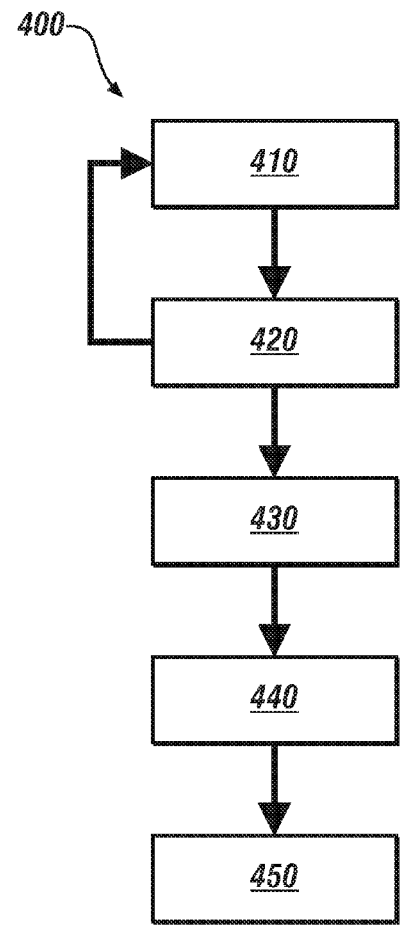
FIG. 3 illustrates an exemplary process to utilize historical data uploaded to a vehicle to display a ghosting image upon a head-up display in the vehicle, in accordance with the present disclosure.

FIG. 3 illustrates an exemplary process to utilize historical data uploaded to a vehicle to display a ghosting image upon a HUD in the source vehicle. Table 1 is provided as a key wherein the numerically labeled blocks and the corresponding functions are set forth as follows.

TABLE 1

| BLOCK | BLOCK CONTENTS |
| --- | --- |
| 410 | Upload Historical Data to Vehicle |
| 420 | Monitor a Current Vehicle Location and Orientation |

TABLE 1-continued

| BLOCK | BLOCK CONTENTS |
| --- | --- |
| 430 | Compare and Evaluate the Current Vehicle Location and Orientation to the Uploaded Historical Data |
| 440 | Determine a Desired Location and Orientation for the Vehicle at Some Projected Lead Time |
| 450 | Register and Display a Ghosting Image Illustrating the Desired Location and Orientation |

Process 400 starts at block 410, wherein historical data related to vehicle location and orientation upon a race track is uploaded. At block 420, current vehicle location and vehicle orientation are monitored. Current vehicle location and vehicle orientation can be fed back and associated with historical data, for example, to provide indexed comparative values of the vehicle location and orientation. At block 430, a comparison is performed of the historical data and the current data, and based upon an evaluation of the comparison, a desired location and orientation for the vehicle can be determined at block 440. At block 450, a ghosting image is rendered upon the HUD based upon the determined desired location and orientation.

Figure 4:
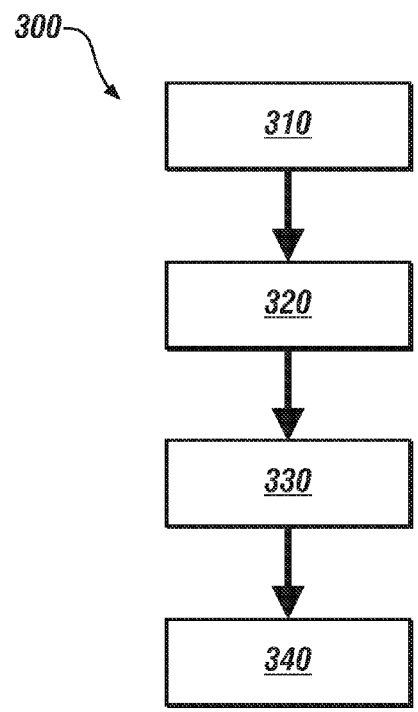
FIG. 4 illustrates an exemplary process to display a ghosting image upon a head-up display, in accordance with the present disclosure.

FIG. 4 illustrates an exemplary process to display a ghosting image upon a HUD. Table 2 is provided as a key wherein the numerically labeled blocks and the corresponding functions are set forth as follows.

TABLE 2

| BLOCK | BLOCK CONTENTS |
| --- | --- |
| 310 | Monitor an Output of an Eye Location Sensing System |
| 320 | Monitor a Current Predicted Route of Travel |
| 330 | Determine a Registered Desired Location Graphic Based Upon the Monitored Eye Location Sensing System and the Current Predicted Route of Travel |
| 340 | Display the Registered Desired Location Graphic Upon a Head-up Display |

Process 300 starts at block 310, wherein an eye location sensing system is monitored to provide a location of the eyes of the driver of the vehicle. In block 320, a planned route of travel is monitored. Monitoring or determining such a current predicted route of travel can include monitoring an operating environment of the vehicle, including determination of a current location and orientation of the vehicle with respect to the road, for example, through monitored vehicle sensors. Further, monitoring or determining the current predicted route of travel can include route planning including a global positioning and 3D map device monitoring a planned destination, plotting a planned route to the planned destination, and providing data regarding the location of the vehicle and the planned route while the vehicle is in transit to the destination. In block 330, a registered desired location graphic is determined based upon the monitored eye location sensing system and the monitored planned route of travel according to methods disclosed herein, illustrating suggested operation of the vehicle through a ghosting image upon the HUD. By monitoring the eye location sensing system, a determined graphic can be registered to the scene visible to the driver through the HUD. In block 340, the determined graphic is displayed upon the HUD.

The methods described herein can be utilized to display a ghosting image upon a windscreen HUD, projecting a graphic to aid the driver in control of the source vehicle. Graphics can similarly be projected upon other surfaces or windows of the source vehicle. For example, a ghosting image can be displayed upon a side window of the source vehicle to aid a driver in parallel parking. An exemplary graphic can provide an animated graphic showing a desired parallel parking maneuver for the source vehicle registered to the side window or windows of the source vehicle.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method to display a ghosting image upon a transparent windscreen head-up display in a source vehicle, the method comprising:
 monitoring an operating environment of the source vehicle;
 determining a first ghosting image based upon the operating environment of the source vehicle;
 determining a current location and a current orientation of the source vehicle travelling upon a current roadway;
 monitoring historical data for the source vehicle operating upon the current roadway in the past based on the current location and the current orientation of the source vehicle;
 monitoring instantaneous vehicle behavior characteristics of the source vehicle in a first particular area of the current roadway based on the current location and the current orientation of the source vehicle;
 identifying past vehicle behavior characteristics of the source vehicle in the first particular area that are indicative of the instantaneous vehicle behavior characteristics based on the monitored historical data;
 comparing the identified past vehicle behavior characteristics of the source vehicle in the first particular area to a traffic flow condition;
 predicting adverse traffic flow behavior in a second particular area of the roadway based on corresponding past vehicle behavior characteristics of the source vehicle in the second particular area of the current roadway when the identified past vehicle behavior characteristics satisfy the traffic flow condition, wherein the second particular area succeeds the first particular area in the direction of travel of the source vehicle upon the current roadway;
 determining a historical ghosting image to prepare the source vehicle for a maneuver in the second particular area on when the adverse traffic flow behavior in the second particular area is predicted; and
 displaying the first ghosting image and the historical ghosting image upon the head-up display.

2. The method of claim 1, further comprising monitoring a driver registration input; and
 wherein the first ghosting image is a registered ghosting image determined based upon the driver registration input.

3. The method of claim 2, wherein the registered first ghosting image comprises a registered desired location graphic illustrating a future desired location for the source vehicle.

4. The method of claim 3, further comprising:
 monitoring a planned route of navigation for the source vehicle; and
 wherein determining the registered desired location graphic is further based upon the planned route of navigation.

5. The method of claim 4, wherein the registered desired location graphic comprises a graphic indicating a suggested lane change.

6. The method of claim 4, wherein the registered desired location graphic comprises a graphic indicating a suggested maneuver based upon the planned route of navigation.

7. The method of claim 3, wherein the operating environment of the source vehicle comprises an object in front of the source vehicle; and
 wherein the registered desired location graphic comprises a graphic indicating a desired evasive maneuver based upon the object in front of the source vehicle.

8. The method of claim 3, wherein the registered desired location graphic comprises an animated parking aid.

9. The method of claim 3, wherein the registered desired location graphic comprises a driver education graphic.

10. The method of claim 9, wherein determining the registered desired location graphic is further based upon traffic laws and traffic signals.

11. The method of claim 9, wherein determining the registered desired location graphic is further based upon an input planned route of travel.

12. The method of claim 3, wherein the source vehicle comprises a commercial vehicle.

13. The method of claim 3, wherein the source vehicle comprises a military vehicle; and
 wherein determining the registered desired location graphic is further based upon a monitored command for the source vehicle.

14. The method of claim 3, wherein the source vehicle comprises a emergency response vehicle; and
 wherein determining the registered desired location graphic is further based upon an instruction from a dispatcher for the source vehicle.

15. The method of claim 3, wherein the registered desired location graphic comprises an instruction to maintain a distance from an emergency vehicle.

16. The method of claim 3, wherein the registered desired location graphic comprises an instruction to stop for a school bus.

17. The method of claim 3, wherein the source vehicle comprises a law enforcement vehicle; and
 wherein determining the registered desired location graphic is further based upon a monitored command for the source vehicle.

18. The method of claim 3, wherein the source vehicle comprises a racing vehicle; and
 wherein determining the registered ghosting image is further based upon a best lap for the source vehicle.

19. The method of claim 18, further comprising:
 determining a second registered ghosting image comprising a registered desired location graphic illustrating a future desired location for the source vehicle based upon the operating environment of the source vehicle and the driver registration input; and
 displaying the second registered ghosting image upon the head-up display.

20. The method of claim 19, wherein determining the second registered ghosting image is further based upon monitored racing conditions.

21. The method of claim 3, further comprising:
determining a desired parallel parking maneuver; and
projecting upon a side window of the source vehicle a ghosting image based upon the desired parallel parking maneuver.

22. The method of claim 2, wherein the registered first ghosting image comprises a registered desired location and orientation graphic illustrating a future desired location and a future desired orientation for the source vehicle.

23. The method of claim 1, wherein the first ghosting image comprises a desired orientation graphic illustrating a future desired orientation for the source vehicle.

24. Apparatus to display a historical ghosting image and a registered desired location graphic upon a transparent windscreen head-up display in a source vehicle, the apparatus comprising:
the transparent windscreen head-up display;
an eye location sensing system;
an enhanced vision system configured to
monitor an operating environment of the source vehicle,
monitor the eye location sensing system,
determine a current location and a current orientation of the source vehicle travelling upon a current roadway,
monitor historical data for the source vehicle operating upon the current roadway in the past based on the current location and the current orientation of the source vehicle,
monitor instantaneous vehicle behavior characteristics of the source vehicle in a first particular area of the current roadway based on the current location and the current orientation of the source vehicle;
identify past vehicle behavior characteristics of the source vehicle in the first particular area that are indicative of the instantaneous vehicle behavior characteristics based on the monitored historical data,
compare the identified past vehicle behavior characteristics of the source vehicle in the first particular area to a traffic flow condition,
predict adverse traffic flow behavior in a second particular area of the roadway based on corresponding past vehicle behavior characteristics of the source vehicle in a second particular area of the current roadway when the identified past vehicle behavior characteristics satisfy the traffic flow condition, wherein the second particular area succeeds the first particular area in the direction of travel of the source vehicle upon the current roadway,
determine the historical ghosting image to prepare the source vehicle for a maneuver in the second particular area when the adverse traffic flow behavior in the second particular area is predicted,
determine the registered desired location graphic illustrating a future desired location for the source vehicle based upon the operating environment of the source vehicle and the eye location sensing system; and
a graphic projection system displaying the historical ghosting image and the registered desired location graphic upon the head-up display.

25. The apparatus of claim 24, further comprising:
a camera device providing a visual image of the operating environment of the source vehicle; and
a global positioning and digital map device providing information related to a location of the source vehicle; and
wherein the enhanced vision system configured to monitor the operating environment of the source vehicle comprises the enhanced vision system configured to analyze the visual image and the information related to the location of the source vehicle.

* * * * *